(12) United States Patent
Ell (10) Patent No.: US 10,712,129 B2
(45) Date of Patent: Jul. 14, 2020

(54) TERMINAL-IMAGING SEEKER WITH SOFTWARE DEFINED OPTICS

(71) Applicant: Rosemount Aerospace Inc., Burnsville, MN (US)

(72) Inventor: Todd Anthony Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 183 days.

(21) Appl. No.: 15/684,305

(22) Filed: Aug. 23, 2017

(65) Prior Publication Data

US 2019/0063875 A1    Feb. 28, 2019

(51) Int. Cl.
| | |
|---|---|
| *F41G 7/22* | (2006.01) |
| *G02B 6/06* | (2006.01) |
| *G02B 5/00* | (2006.01) |
| *F42B 10/46* | (2006.01) |
| *G02B 27/46* | (2006.01) |

(Continued)

(52) U.S. Cl.
CPC ......... *F41G 7/2246* (2013.01); *F41G 7/2253* (2013.01); *F41G 7/2293* (2013.01); *F42B 10/46* (2013.01); *F42B 15/01* (2013.01); *G02B 5/005* (2013.01); *G02B 6/04* (2013.01); *G02B 6/06* (2013.01); *G02B 27/0037* (2013.01);

(Continued)

(58) Field of Classification Search
CPC .................................................. G02B 27/64
See application file for complete search history.

(56) References Cited

U.S. PATENT DOCUMENTS

| | | | | | |
|---|---|---|---|---|---|
| 4,131,248 | A | * | 12/1978 | Berglund | F41G 7/2293 244/3.16 |
| 4,183,664 | A | * | 1/1980 | Rambauske | F41G 7/2293 244/3.16 |

(Continued)

FOREIGN PATENT DOCUMENTS

| | | | | |
|---|---|---|---|---|
| FR | 2752953 A1 | * | 3/1998 | ............. G02B 27/64 |
| JP | 03221797 A | | 9/1991 | |
| WO | 2006125975 A1 | | 11/2006 | |

OTHER PUBLICATIONS

Asif, M. Salman, "FlatCam: Thin, Bare-Sensor Cameras Using Coded Aperture and Computation", Department of Electrical and Computer Engineering, Rice University, dated Jan. 27, 2016, 12 pages.

(Continued)

*Primary Examiner* — Bernarr E Gregory
(74) *Attorney, Agent, or Firm* — Kinney & Lange, P.A.

(57) ABSTRACT

Apparatus and associated methods relate to forming images for a terminal-imaging seeker using software defined optics. An optically-neutral lens with a ballistic-ogive-shaped front surface receives light from a scene aligned along an optical axis. The optically-neutral lens transmits the light received at the ballistic-ogive-shaped front surface to a planar rear surface, which is then transmitted to a coded-aperture plate aligned with the optical axis. The coded-aperture plate includes a plurality of pinhole-like apertures, each of which is configured to perform pinhole-like lensing of the scene. The plurality of pinhole-like apertures form a multiplex of overlapping images on a focal plane array aligned with the optical axis. An image processor reconstructs, based on a configuration of the plurality of pinhole-like apertures and the multiplex of overlapping images, a single image of the scene.

20 Claims, 6 Drawing Sheets

(51) Int. Cl.
*G06K 9/00* (2006.01)
*G02B 6/04* (2006.01)
*F42B 15/01* (2006.01)
*G02B 27/00* (2006.01)
*F41G 7/00* (2006.01)

(52) U.S. Cl.
CPC ......... *G02B 27/46* (2013.01); *G06K 9/00624* (2013.01); *G02B 2207/129* (2013.01)

(56) References Cited

U.S. PATENT DOCUMENTS

| | | | |
|---|---|---|---|
| 4,690,512 A * | 9/1987 | Forsyth | B29D 11/00009 156/310 |
| 5,737,075 A * | 4/1998 | Koch | G01S 7/4816 342/179 |
| 5,784,156 A * | 7/1998 | Nicholson | F41G 7/2293 244/3.16 |
| 5,867,264 A * | 2/1999 | Hinnrichs | G01J 3/2846 356/310 |
| 7,626,150 B2 * | 12/2009 | Chen | H04N 5/2259 250/201.3 |
| 7,652,765 B1 * | 1/2010 | Geshwind | G01J 3/0208 356/330 |
| 8,035,085 B2 | 10/2011 | Slinger | |
| 8,243,353 B1 | 8/2012 | Gutin et al. | |
| 8,354,626 B2 * | 1/2013 | Eckhardt | F41G 7/2293 244/3.16 |
| 9,172,850 B2 | 10/2015 | Ludwig | |
| 9,983,063 B1 * | 5/2018 | Tener | G01J 3/0286 |
| 2007/0165220 A1 | 7/2007 | Brady et al. | |
| 2012/0268574 A1 * | 10/2012 | Gidon | H04N 5/2254 348/49 |
| 2013/0208082 A1 * | 8/2013 | Williams | H04N 5/2254 348/36 |
| 2014/0139630 A1 | 5/2014 | Kowalevicz | |
| 2017/0041571 A1 | 2/2017 | Tyrrell et al. | |

OTHER PUBLICATIONS

DeWeert, Michael J., "Lensless Coded-Aperture Imaging with Separable Doubly-Toeplitz Masks", Optical Engineering vol. 54(2) Feb. 2015, 10 pages.

Stamenov, Igor, "Panoramic Monocentric Imaging Using Fiber-Coupled Focal Planes", Optical Society of America, vol. 22, No. 26, Dec. 15, 2014, 14 pages.

Extended European Search Report dated Jan. 8, 2019, received for corresponding European Application No. 66.138741.

* cited by examiner

Fig. 2C (FACE VIEW)

TERMINAL-IMAGING SEEKER WITH SOFTWARE DEFINED OPTICS

BACKGROUND

Precision guided munitions can use terminal-imaging seekers to improve weapon effectiveness. Munitions manufacturers are ever developing smaller and higher-shock-tolerant munitions. Therefore, smaller and higher-shock-tolerant terminal-imaging seekers are being sought. Many munitions have tapered nose cones so as to have a high ballistic coefficient. Terminal-imaging seekers are often located in these tapered nose cones. The terminal-imaging seekers must be able to survive the launch shocks of the munitions in which they are located. Terminal-imaging seekers include cameras that traditionally have a lens stack, which can be relatively heavy and big, thereby adding weight and size to the munitions for which they are designed. What are needed are systems and methods that reduce the size and/or weight of a terminal-imaging seeker.

SUMMARY

Apparatus and associated methods relate to a system for creating corrected images of a scene for a terminal-imaging seeker. The system includes a focal plane array aligned with an optical axis and having an imaging region comprising a plurality of pixels. The system includes a coded-aperture plate aligned along the optical axis and having opaque regions and a plurality of pinhole-like transparent regions separated from one another by the opaque regions. The coded-aperture plate is configured to transmit light through the plurality of pinhole-like transparent regions onto the imaging region of the focal plane array thereby forming a raw shadow image. The raw shadow image includes pixel data generated by the plurality of pixels. The system includes an optically-neutral lens aligned along the optical axis and having a front convex surface and a back planar surface. The front convex surface is configured provide low aerodynamic drag when engaging the air at the leading edge of the terminal-imaging seeker. The optically-neutral lens is configured to receive light from a scene aligned along the optical axis and is further configured to transmit light from the scene received at the front convex surface to the back planar surface in an optically-neutral fashion. The system also includes an image processor configured to create, based on an algorithm corresponding to a configuration of the plurality of pinhole-like transparent regions and on the raw shadow image, a corrected image.

Some embodiments relate to a method for creating corrected images of a scene for a terminal-imaging seeker. The method includes receiving, at a front convex surface of a lens, light from a scene aligned along an optical axis. Then the light received at the front convex surface of the lens is transmitted to a rear planar surface of the lens in an optically-neutral fashion. A plurality of overlapping images of a scene aligned along an optical axis is created, via a focal plane array and using a portion of the light transmitted to the rear planar surface. Then, a single image of the scene aligned along the optical axis is created, via an image processor and based on the plurality of overlapping images. Then, a target and pixel coordinates upon which the target is located in the single image is identified, via the image processor.

DETAILED DESCRIPTION

Apparatus and associated methods relate to forming images for a terminal-imaging seeker using software defined optics. An optically-neutral lens with a ballistic-ogive-shaped front surface receives light from a scene aligned along an optical axis. The optically-neutral lens transmits the light received at the ballistic-ogive-shaped front surface to a planar rear surface, which is then transmitted to a coded-aperture plate aligned with the optical axis. The coded-aperture plate includes a plurality of pinhole-like apertures, each of which is configured to perform pinhole-like lensing of the scene. The plurality of pinhole-like apertures form a multiplex of overlapping images on a focal plane array aligned with the optical axis. An image processor reconstructs, based on a configuration of the plurality of pinhole-like apertures and the multiplex of overlapping images, a single image of the scene.

Figure 1A:
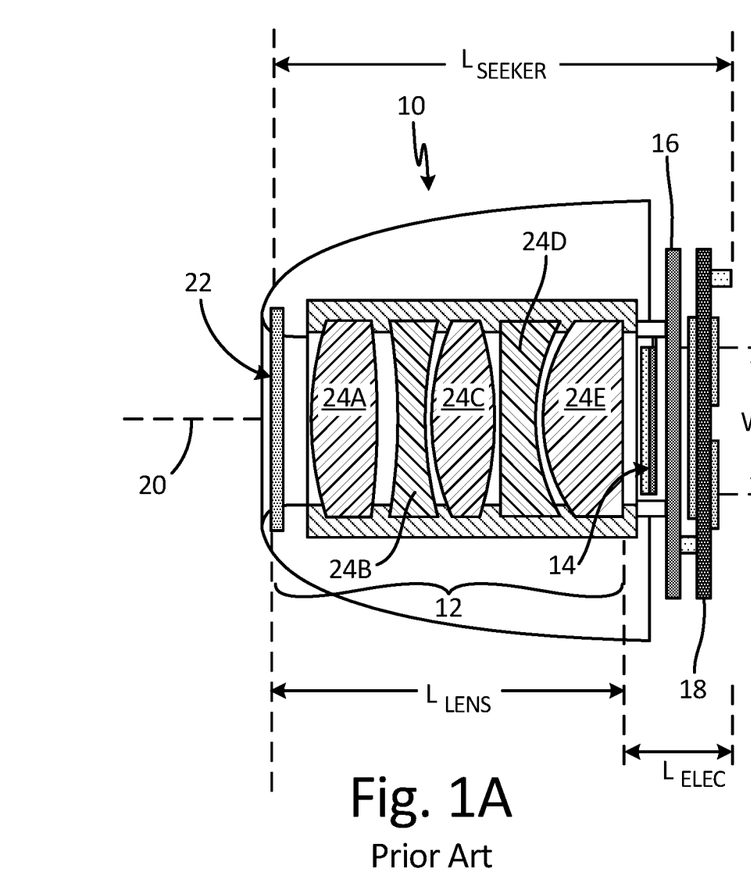
FIGS. 1A-1B are cross-sectional views of two different systems for creating images of a scene for a terminal-imaging seeker.
Figure 1B:
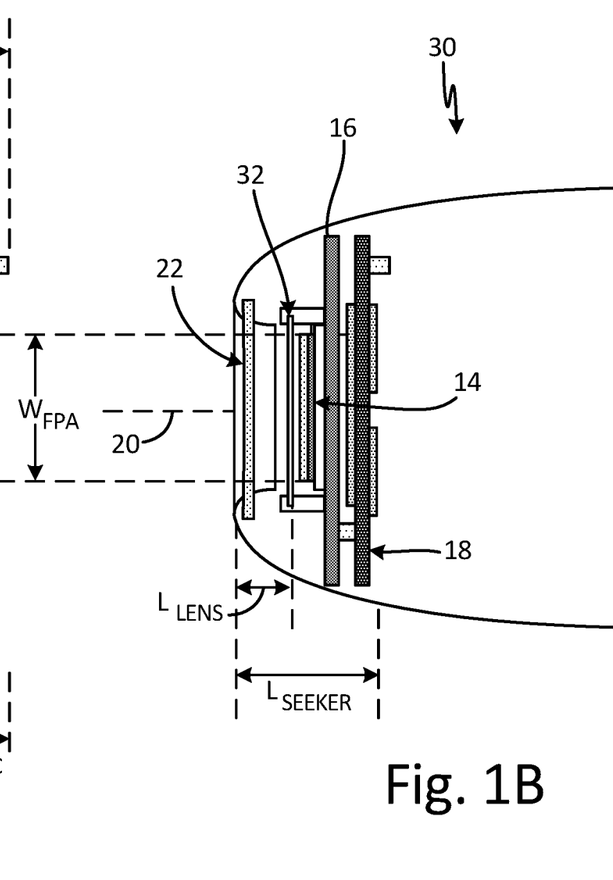

FIGS. 1A-1B are cross-sectional views of two different systems for creating images of a scene for a terminal-imaging seeker. In FIG. 1A, prior art terminal-imaging seeker 10 includes lens stack 12, focal plane array 14, imaging board 16, and video processing card 18, each aligned along optical axis 20. In the depicted embodiment, lens stack 12 includes blunt faceplate 22, and a plurality of lenses 24A-24E. Optical lens stack 12 is configured to receive light from a scene aligned along optical axis 20 and to focus the received light onto focal plane array 14, thereby forming an image of the aligned scene. The formed image includes pixel data generated by the plurality of pixels. Imaging board 16 receives the pixel data generated by focal plane array 14 and performs image processing operations using the received pixel data. The depicted embodiment has video processing card 18, which receives each of the processed images, and then outputs each received image in a video stream.

In the embodiment depicted in FIG. 1A, the lens stack is the most volumetric element of terminal-imaging seeker 10. Axial length $L_{SEEKER}$ of terminal-imaging seeker 10 includes axial length $L_{LENS}$ of lens stack 12 and axial length $L_{ELEC}$ of focal plane array 14, imaging board 16, and video processing card 18. In the depicted embodiment, axial length $L_{LENS}$ of lens stack 12 is typically greater than 50% of axial length $L_{SEEKER}$ of terminal-imaging seeker 10. Axial length $L_{LENS}$ of lens stack 12 is also greater than a lateral width $W_{FPA}$ of focal plane array 16.

In FIG. 1B, terminal-imaging seeker 30 includes blunt window faceplate 22, focal plane array 14, imaging board 16, and video processing card 18, but instead of lens stack 12, terminal-imaging seeker 30 includes coded-aperture plate 32. Comparing FIGS. 1A and 1B to one another, a stark difference in axial length $L_{SEEKER}$ is discernable. In the FIG.

1B embodiment, axial length $L_{LENS}$ of terminal-imaging seeker 30 is less than lateral width $W_{FPA}$ of focal plane array 16. By replacing lens stack 12 with coded-aperture plate 32, a dramatic decrease in system volume can be achieved. Such a replacement can be made if terminal-imaging seeker 30 can create images of the scene aligned along optical axis 20 that have sufficient quality for use in target detection.

Such sufficient quality imaging can be obtained using coded-aperture plate 32. Coded-aperture plates extend the concept of a pinhole camera. Coded-aperture plates have a plurality of pinhole-like apertures, each of which generates an image of the scene aligned along the optical axis. Each of these images of the scene is overlapping but shifted in space. The result of this plurality of pinhole-like apertures is a raw shadow image that includes a multiplex of overlapping images. A single image of the scene can be reconstructed from the multiplex of overlapping images using one of a variety of reconstruction algorithms. Each reconstruction algorithm corresponds to a specific configuration of the plurality of pinhole-like apertures. Various configurations of the plurality of pinhole-like apertures lend themselves to various corresponding algorithms. Some specific configurations of the pinhole-like apertures correspond to reconstruction algorithms that are less process intensive than other reconstruction algorithms for other specific configurations of pinhole-like apertures. For example, configurations known as separable doubly-Toeplitz configurations can have reconstruction algorithms that are relatively efficient, even for images formed by a large number of pixels.

Because coded-aperture plate performs the function of a lens, no additional non-optically neutral lens is needed in the system. Because the FIG. 1B embodiment uses a coded-aperture plate instead of a lens stack, the FIG. 1B embodiment can be called a flat camera design. The simplest optically neutral lens is simply a flat plate of glass. Such a flat plate of glass can be a viable alternative design when aerodynamic loading is not an issue.

Figure 2A:
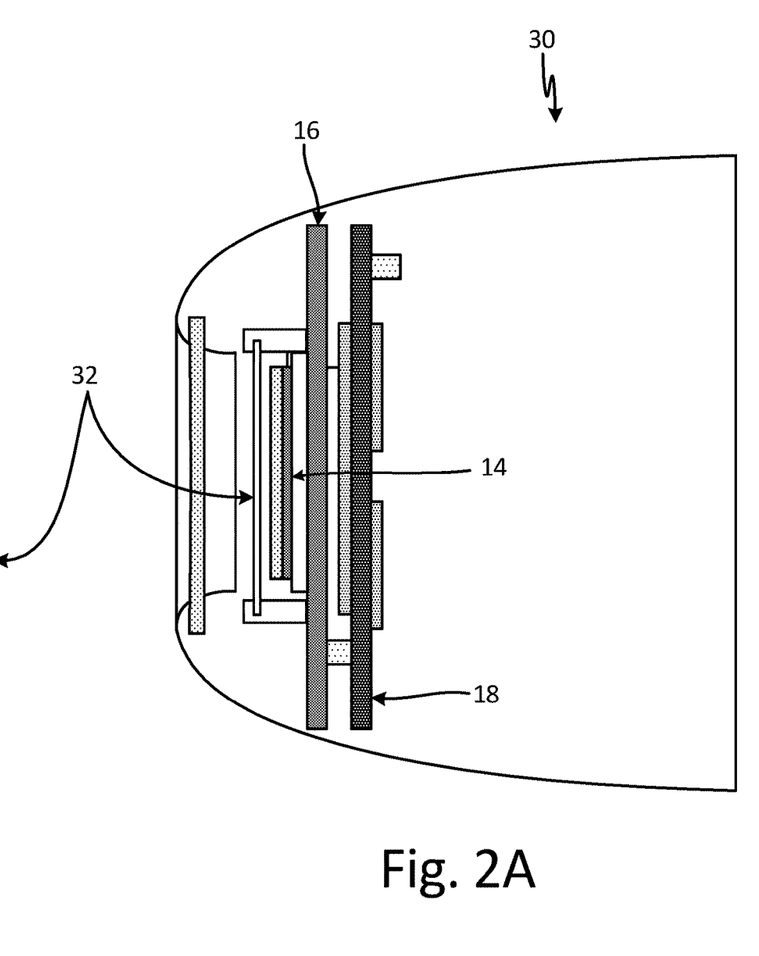
FIGS. 2A-2C are schematic views of an imaging system for a terminal-imaging seeker depicting a juxtaposition of a coded-aperture plate and a focal plane array.
Figure 2B:
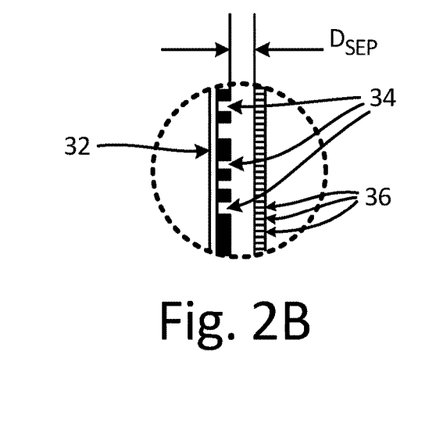
Figure 2C:
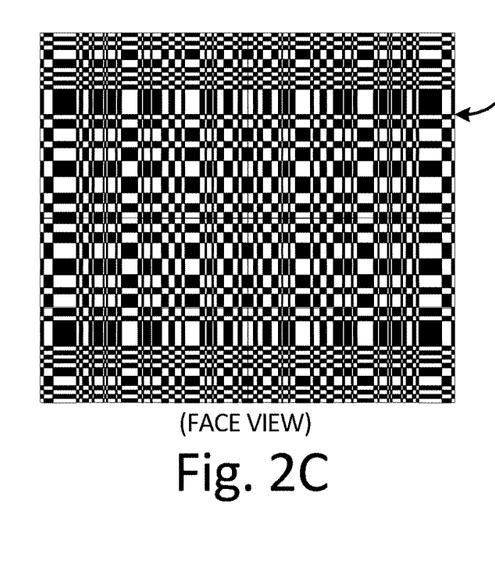

FIGS. 2A-2C are schematic views of an imaging system for a terminal-imaging seeker depicting a juxtaposition of a coded-aperture plate and a focal plane array. In FIG. 2A, terminal-imaging seeker 30 (depicted in FIG. 1B) is reproduced for the purpose of illustrating configurations and details of coded-aperture plate 32 and focal plane array 18. In FIG. 2B, sections of coded-aperture plate 32 and focal plane array 18 are shown in cross-sectional magnification. Individual apertures 34 of coded-aperture plate 32 are shown. Also shown are individual pixels 36 of focal plane array 14. Coded-aperture plate 32 and focal plane array 14 are axially separated one from another by axial separation distance $D_{SEP}$. Axial separation distance $D_{SEP}$, as depicted in FIG. 2B, is the axial distance between a rear surface of coded-aperture plate 32 and a front surface of focal plane array 14.

As indicated in the depicted embodiment, axial separation distance $D_{SEP}$ is relatively small, with respect to many other dimensions of terminal-imaging seeker 30. For example, axial separation distance $D_{SEP}$ can be less than 200 microns or less. In some embodiments, axial separation distance $D_{SEP}$ is less than 100 times a lateral width dimension of each of pixels 36. Note also the dimensions of a lateral width dimension of individual apertures 34. Such lateral width dimensions can vary between individual apertures 34. In some embodiments, the lateral width dimension of each individual aperture 34 is an integral multiple of a minimum lateral width dimension. The minimum lateral width dimension can be less than three times the lateral width dimension of a lateral width dimension of a pixel, for example.

In FIG. 2C, an axial plan view or axial view of coded-aperture plate 32 is shown. Coded-aperture plate 32 includes a plurality of apertures 34 of various sizes and aspect ratios. Each of the plurality of apertures 34 can be used, in pinhole camera fashion, to form an image upon focal plane array 14. By forming a multiplex of pinhole camera-like images, signal strength can be increased over a single pinhole-camera-like image. The signal strength increase comes at the expense of forming a multiplex of overlapping images, from which a single image can be formed using a reconstruction algorithm. The reconstruction algorithm selected depends on the configuration of the plurality of pinhole-like apertures 34 of coded-aperture plate 32.

Figure 3:
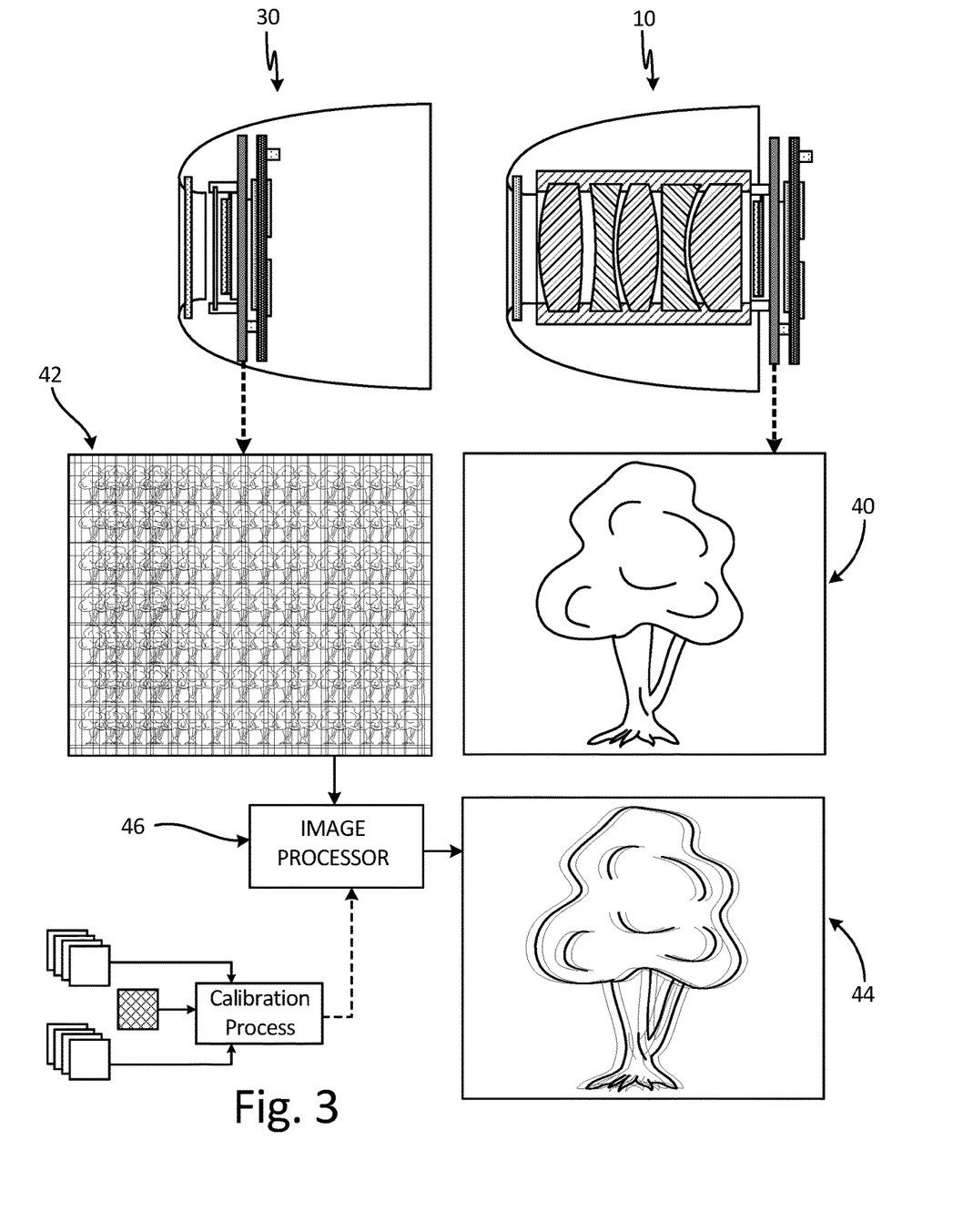
FIG. 3 is a schematic view depicting a method of reconstructing an image of a scene from a raw shadow images created using a coded-aperture plate.

FIG. 3 is a schematic view depicting a method of reconstructing an image of a scene from a raw shadow image created using a coded-aperture plate. In FIG. 3, both terminal-imaging seekers 10 and 30 depicted in FIGS. 1A and 1B, respectively, are shown. Terminal-imaging seeker 10 produces raw image 40, which is not a multiplex of overlapping images, and therefore does not require reconstruction. Terminal-imaging seeker 30 produces raw shadow image 42, which is formed as an image containing multiple overlapping exposures of the scene.

Reconstructed image 44 is formed using a reconstruction algorithm that is known in the art. For example, DeWeert and Farm disclose one such reconstruction algorithm in "Lensless Coded-Aperture Imaging with Separable Doubly-Toeplitz Masks," *Opt. Eng.* 54(2), 023102 (Feb. 3, 2015). doi:10.1117/1.OE.54.2.023102, the entire disclosure of which is hereby incorporated by reference. Reconstruction of image 44 is based on the specific configuration of the plurality of apertures 34 of coded-aperture plate 32 and based on shadow image data 42. Reconstruction of image 44 can be performed, for example, by image processor 46.

Figure 4:
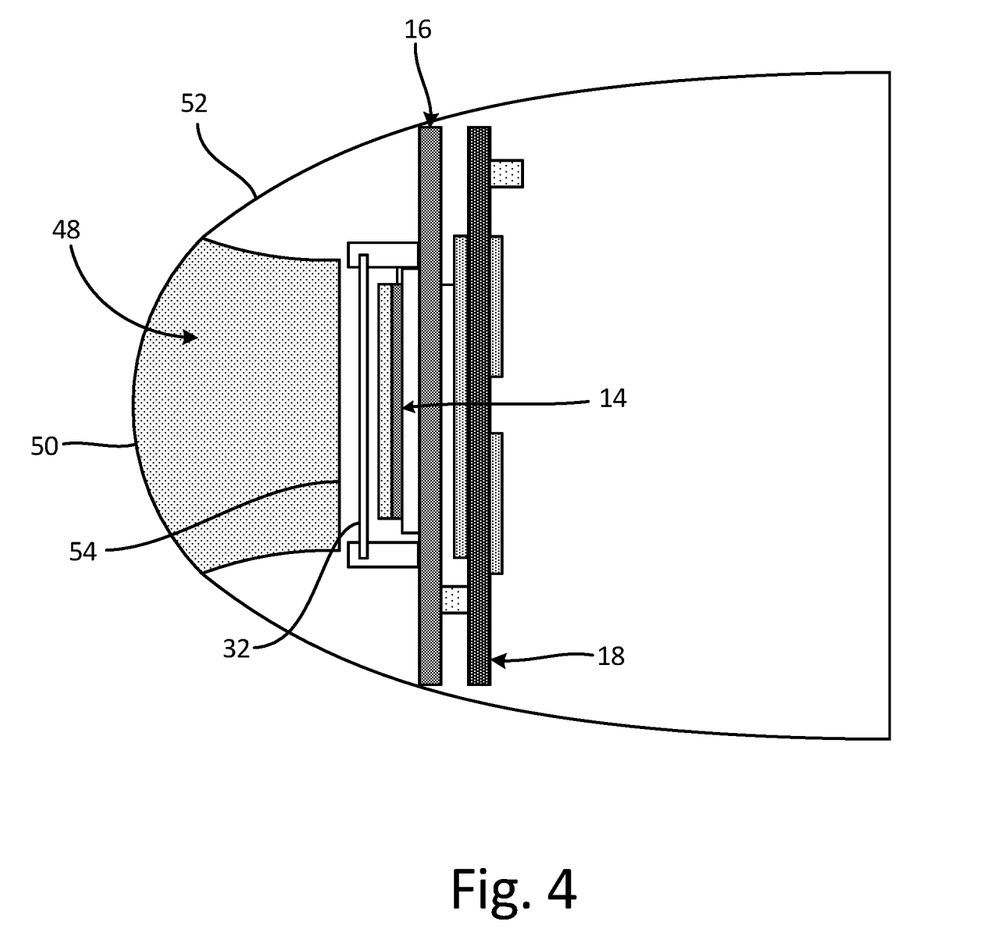
FIG. 4 is a cross-sectional view of a tapered nose cone of a munition having an optically-neutral lens that is conformal with the munition nose cone.

FIG. 4 is a cross-sectional view of a tapered nose cone of a munition having an optically-neutral lens that is conformal with the munition nose cone. In FIG. 4, terminal-imaging seeker 30 depicted in FIG. 1B is reproduced, but instead of blunt window faceplate 22, includes optically-neutral lens 48. Optically-neutral lens 48 has front convex surface 50 which has a convex geometry that is conformal with nose cone 52. Optically-neutral lens 48 has a front convex surface 50 configured to provide a high ballistic coefficient. Optically-neutral lens 48 is configured to transmit light received by front convex surface 50 to rear planar surface 54, in an optically-neutral fashion.

Optical neutrality, as used in this context, means that images formed with and without optically-neutral lens by the imaging system, which includes coded-aperture plate 32, and focal plane array 14, are substantially the same one to another. In the depicted embodiment, optical-neutrality can be obtained using a graded index (GRIN) material in optically-neutral lens. The refractive index of optically-neutral lens 48 is graded so as to transmit light from front convex surface 50 to rear planar surface 54 in an optically-neutral fashion (e.g., the transmitted light has the same phase and/or intensity relation at rear planar surface 54 with or without optically-neutral lens 48 in use).

Figure 5:
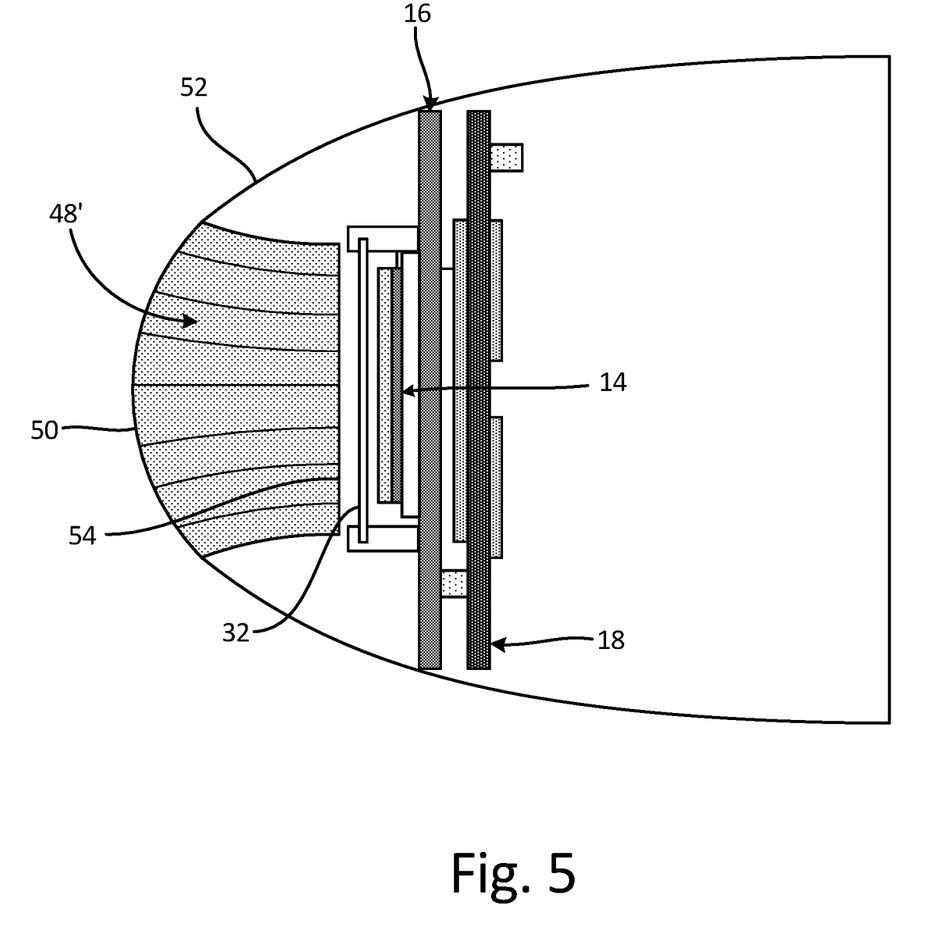
FIG. 5 is a cross-sectional view of a tapered nose cone of a munition having a tapered imaging fiber optic faceplate that is conformal with the munition nose cone.

FIG. 5 is a cross-sectional view of a tapered nose cone of a munition having a tapered imaging fiber optic faceplate that is conformal with the munition nose cone. In FIG. 5, terminal-imaging seeker 30 depicted in FIG. 4 is reproduced, but instead of graded index lens 48, includes tapered-imaging fiber-optic lens 48'. Tapered-imaging fiber-optic lens 48' again has front convex surface 50 which has a convex geometry that is conformal with nose cone 52. And again, tapered-imaging fiber-optic lens 48' has a front convex surface 50 configured to provide a high ballistic coefficient. Tapered-imaging fiber-optic lens 48' is configured to transmit light received by front convex surface 50 to rear planar surface 54, in an optically-neutral fashion (e.g., by maintaining a spatial intensity relation at the two surfaces 50 and 54).

In another embodiment, a munition can be fitted with a standard glass lens. The standard glass lens can have a ogive shape on a leading surface and a flat rear planar surface. The standard glass lens need not be optically neutral. To correct for non-optical-neutrality, a planar metasurface lens may be affixed between the flat rear planar surface of the standard glass lens and focal plane array 14.

Figure 6:
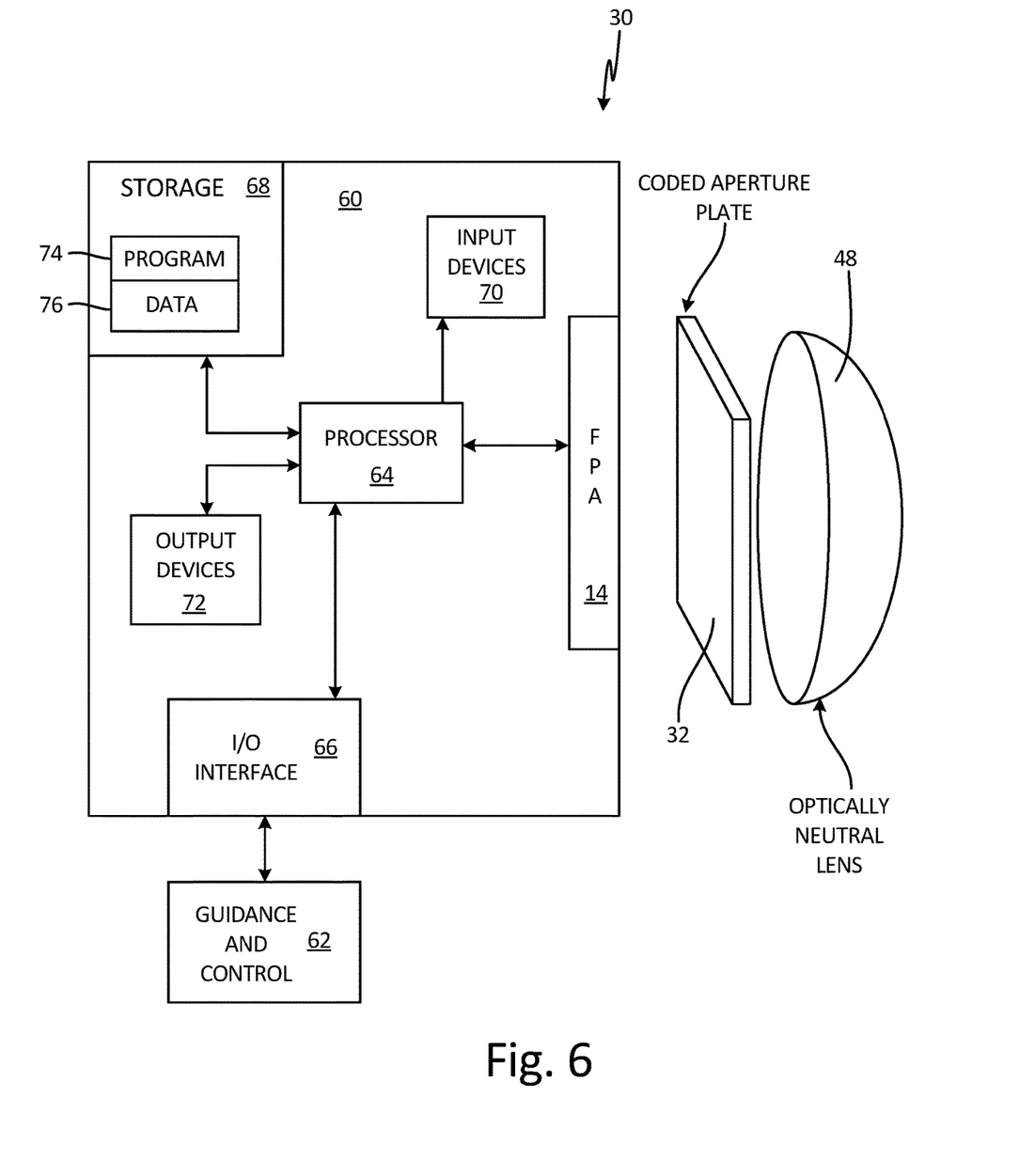
FIG. 6 is block diagram of an embodiment of a terminal-imaging seeker and munition guidance and control system.

FIG. 6 is block diagram of an embodiment of a terminal-imaging seeker and munition guidance and control system. In FIG. 6, terminal-imaging seeker 30 includes controller 60, coded-aperture plate 32, and optically-neutral lens 48, Terminal-imaging seeker 30 is depicted interfacing with munition guidance and control system 62 of a munition. Controller 60 includes processor(s) 64, input/output interface 66, storage device(s) 68, input devices 70, output devices 72, and focal plane array 14. Storage device(s) 68 has various storage or memory locations. Storage device(s) 68 includes program memory 74, and data memory 76. Controller 60 is in communication with munition guidance and control system 62 via input/output interface 66. Munition guidance and control system 62 can provide controller 60 with metrics indicative of a munition location, orientation, speed, etc. Controller 60 can provide munition guidance and control system 62 with signals indicative of location of a target relative to the munition, for example.

As illustrated in FIG. 6, controller 60 includes processor(s) 64, input/output interface 66, storage device(s) 68, input devices 70, and output devices 72. However, in certain examples, controller 60 can include more or fewer components. For instance, in examples where controller 60 is an image processing system, controller 60 may not include input devices 70 and/or output devices 72. Controller 60 may include additional components such as a battery that provides power to components of controller 60 during operation.

Processor(s) 64, in one example, is configured to implement functionality and/or process instructions for execution within controller 60. For instance, processor(s) 64 can be capable of processing instructions stored in storage device(s) 68. Examples of processor(s) 64 can include any one or more of a microprocessor, a controller, a digital signal processor (DSP), an application specific integrated circuit (ASIC), a field-programmable gate array (FPGA), or other equivalent discrete or integrated logic circuitry.

Input/output interface 66, in some examples, includes a communications module. Input/output interface 66, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

Storage device(s) 68 can be configured to store information within controller 60 during operation. Storage device(s) 68, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 68 is a temporary memory, meaning that a primary purpose of Storage device(s) 68 is not long-term storage. Storage device(s) 68, in some examples, is described as volatile memory, meaning that storage device(s) 68 do not maintain stored contents when power to controller 60 is turned off. Examples of volatile memories can include random access memories (RAM), dynamic random access memories (DRAM), static random access memories (SRAM), and other forms of volatile memories. In some examples, storage device(s) 68 is used to store program instructions for execution by processor(s) 64. Storage device(s) 68, in one example, is used by software or applications running on controller 60 (e.g., a software program implementing long-range cloud conditions detection) to temporarily store information during program execution.

Storage device(s) 68, in some examples, also include one or more computer-readable storage media. Storage device(s) 68 can be configured to store larger amounts of information than volatile memory. Storage device(s) 68 can further be configured for long-term storage of information. In some examples, Storage device(s) 68 include non-volatile storage elements. Examples of such non-volatile storage elements can include magnetic hard discs, optical discs, flash memories, or forms of electrically programmable memories (EPROM) or electrically erasable and programmable (EEPROM) memories.

Although terminal-imaging seekers 30 are typically embedded systems, in some embodiments, terminal-imaging seekers 330 can include input devices 70. In some examples, input devices can be configured to receive input from a user, such as, for example, when in a configuration mode, and/or for calibration during manufacturing. Examples of input devices 70 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

Although terminal-imaging seekers 30 are typically embedded systems, in some embodiments, terminal-imaging seekers 330 can include output devices 72. Output devices can be configured to provide output to a user, such as, for example, during a configuration, and/or for calibration. Examples of output devices 72 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for creating a corrected image of a scene for a terminal-imaging seeker. The system includes a focal plane array aligned with an optical axis and having an imaging region comprising a plurality of pixels. The system includes a coded-aperture plate aligned along the optical axis and having opaque regions and a plurality of pinhole-like transparent regions separated from one another by the opaque regions. The coded-aperture plate is configured to transmit light through the plurality of pinhole-like transparent regions onto the imaging region of the focal plane array thereby forming a raw shadow image. The raw shadow image includes pixel data generated by the plurality of pixels. The system includes an optically-neutral lens aligned along the optical axis and having a front convex surface and a back planar surface. The front convex surface is configured to provide low aerodynamic drag when engaging air at a leading edge of the terminal-imaging seeker. The optically-neutral lens is configured to receive light from a scene aligned along the optical axis and configured to transmit light from the scene received at the front convex surface to the back planar surface in an optically-neutral fashion. The system also includes an image processor configured to create, based on an algorithm corresponding to a configuration of the plurality of pinhole-like transparent regions and on the raw shadow image, the corrected image.

The system of the preceding paragraph can optionally include, additionally and/or alternatively, any one or more of the following features, configurations and/or additional components:

A further embodiment of the foregoing system, wherein the optically-neutral lens can be a graded-index (GRIN) lens configured to correct for the optical distortion of the convex surface.

A further embodiment of any of the foregoing systems, wherein the optically-neutral lens can include a fiber optic bundle extending from the front convex surface to the rear planar surface.

A further embodiment of any of the foregoing systems, wherein a maximum distance between the front convex surface of the optically-neutral lens and the focal plane array, as measured along the optical axis, can be less than two times a maximum dimension of the focal plane array, as measured in a lateral direction in a plane of the focal plane array.

A further embodiment of any of the foregoing systems, wherein a maximum distance between the front convex edge of the optically-neutral lens and the focal plane array, as measured along the optical axis, can be less than one-and-a-half times a maximum dimension of the focal plane array, as measured in a direction in a plane of the focal plane array.

A further embodiment of any of the foregoing systems, wherein a maximum distance between the front convex edge of the optically-neutral lens and the focal plane array, as measured along the optical axis, can be less than a maximum dimension of the focal plane array, as measured in a direction in a plane of the focal plane array.

A further embodiment of any of the foregoing systems, wherein the plurality of pinhole-like transparent regions of the coded-aperture plate can be configured as a doubly-Toeplitz design.

A further embodiment of any of the foregoing systems, wherein a distance between a rear surface of the coded-aperture plate and a front surface of the focal plane array can be less than 200 microns.

A further embodiment of any of the foregoing systems, wherein the front convex surface of the optically-neutral lens can have a ballistic ogive shape.

A further embodiment of any of the foregoing systems can further include a target locating system configured to identify, based on the corrected image, a target and pixel coordinates upon which the target is located in the corrected image. The target locating system can be further configured to provide a signal indicative of the identified pixel coordinates.

A further embodiment of any of the foregoing systems, wherein a lateral dimension of each of the pinhole-like apertures can be less than one-hundredth a maximum dimension of the focal plane array, as measured in a lateral direction in a plane of the focal plane array.

A further embodiment of any of the foregoing systems, wherein a lateral dimension of each of the pinhole-like apertures can be less than three times a lateral dimension each of the plurality of pixels of the focal plane array.

Some embodiments relate to a method for creating corrected images of a scene for a terminal-imaging seeker. The method includes receiving, at a front convex surface of a lens, light from a scene aligned along an optical axis. The method includes transmitting, to a rear planar surface of the lens, the light received at the front convex surface of the lens in an optically-neutral fashion. The method includes creating, via a focal plane array and using a portion of the light transmitted to the rear planar surface, a plurality of overlapping images of a scene aligned along an optical axis. The method includes creating, via an image processor and based on the plurality of overlapping images, a single image of the scene aligned along the optical axis. The method also includes identifying, via the image processor, a target and pixel coordinates upon which the target is located in the single image.

The method of the preceding paragraph can optionally include, additionally and/or alternatively, any one or more of the following features, configurations and/or additional components:

A further embodiment of the foregoing method, wherein creating, via a focal plane array, a plurality of overlapping images of a scene aligned along an optical axis can include transmitting, via a plurality of transparent pinhole-like apertures, a portion of the light transmitted to the rear planar surface of the optically-neutral lens, to a focal plane array having a plurality of pixels. Creating, via a focal plane array, a plurality of overlapping images of a scene aligned along an optical axis can also include forming, via the focal plane array, a raw shadow image comprising pixel data generated by the plurality of pixels.

A further embodiment of any of the foregoing methods can further include providing a signal indicative of the identified pixel coordinates to a guidance and control system.

A further embodiment of any of the foregoing methods can further include correcting for the optical distortion of the convex surface.

A further embodiment of any of the foregoing methods, wherein transmitting, to a rear planar surface a lens, light received at the front convex surface of the lens in an optically-neutral fashion can include transmitting, via a fiber optic bundle extending from the front convex surface to the rear planar surface, the light received at the front convex surface of the lens.

A further embodiment of any of the foregoing methods can further include configuring the plurality of pinhole-like transparent regions of the coded-aperture plate as a doubly-Toeplitz design.

A further embodiment of any of the foregoing methods can further include performing an algorithm corresponding to a configuration of the plurality of pinhole-like transparent regions and on the raw shadow image.

A further embodiment of any of the foregoing methods, wherein creating a plurality of overlapping images of a scene aligned along an optical axis can further include locating a plurality of pinhole-like apertures within 200 microns of the focal plane array.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for creating a corrected image of a scene for a terminal-imaging seeker, the system comprising:
   a focal plane array aligned with an optical axis and having an imaging region comprising a plurality of pixels;
   a coded-aperture plate aligned along the optical axis and having opaque regions and a plurality of pinhole-like transparent regions separated from one another by the opaque regions, the coded-aperture plate configured to transmit light through the plurality of pinhole-like transparent regions onto the imaging region of the focal plane array thereby forming a raw shadow image of a corresponding plurality of overlapping images of the scene, the raw shadow image comprising pixel data generated by the plurality of pixels;
   an optically-neutral lens aligned along the optical axis and having a front convex surface and a back planar surface, the front convex surface configured to provide low aerodynamic drag when engaging air at a leading edge of the terminal-imaging seeker, the optically-neutral lens configured to receive light from a scene aligned along the optical axis and configured to transmit light from the scene received at the front convex surface to the back planar surface in an optically-neutral fashion; and
   an image processor configured to create, based on an algorithm corresponding to a configuration of the plurality of pinhole-like transparent regions and on the raw shadow image, the corrected image of the scene.

2. The system of claim 1, wherein the optically-neutral lens is a graded-index (GRIN) lens configured to correct for the optical distortion of the convex surface.

3. The system of claim 1, wherein the optically-neutral lens comprises a fiber optic bundle extending from the front convex surface to the rear planar surface.

4. The system of claim 1, wherein a maximum distance between the front convex surface of the optically-neutral lens and the focal plane array, as measured along the optical axis, is less than two times a maximum dimension of the focal plane array, as measured in a lateral direction in a plane of the focal plane array.

5. The system of claim 1, wherein a maximum distance between the front convex edge of the optically-neutral lens and the focal plane array, as measured along the optical axis, is less than one-and-a-half times a maximum dimension of the focal plane array, as measured in a direction in a plane of the focal plane array.

6. The system of claim 1, wherein a maximum distance between the front convex edge of the optically-neutral lens and the focal plane array, as measured along the optical axis, is less than a maximum dimension of the focal plane array, as measured in a direction in a plane of the focal plane array.

7. The system of claim 1, wherein the plurality of pinhole-like transparent regions of the coded-aperture plate are configured as a doubly-Toeplitz design.

8. The system of claim 1, wherein a distance between a rear surface of the coded-aperture plate and a front surface of the focal plane array is less than 200 microns.

9. The system of claim 1, wherein the front convex surface of the optically-neutral lens has a ballistic ogive shape.

10. The system of claim 1, further comprising:
    a target locating system configured to identify, based on the corrected image, a target and pixel coordinates upon which the target is located in the corrected image, and further configured to provide a signal indicative of the identified pixel coordinates.

11. The system of claim 1, wherein a lateral dimension of each of the pinhole-like apertures is less than one-hundredth a maximum dimension of the focal plane array, as measured in a lateral direction in a plane of the focal plane array.

12. The system of claim 1, wherein a lateral dimension of each of the pinhole-like apertures is less than three times a lateral dimension each of the plurality of pixels of the focal plane array.

13. A method for creating corrected images of a scene for a terminal-imaging seeker, the method comprising:
    receiving, at a front convex surface of a lens, light from a scene aligned along an optical axis;
    transmitting, to a rear planar surface of the lens, the light received at the front convex surface of the lens in an optically-neutral fashion;
    creating, via a focal plane array and using a portion of the light transmitted to the rear planar surface, a plurality of overlapping images of a scene aligned along an optical axis;
    creating, via an image processor and based on the plurality of overlapping images, a single image of the scene aligned along the optical axis; and
    identifying, via the image processor, a target and pixel coordinates upon which the target is located in the single image.

14. The method of claim 13, wherein creating, via a focal plane array, a plurality of overlapping images of a scene aligned along an optical axis comprises:
    transmitting, via a plurality of transparent pinhole-like apertures, a portion of the light transmitted to the rear planar surface of the optically-neutral lens, to a focal plane array having a plurality of pixels; and forming, via the focal plane array, a raw shadow image comprising pixel data generated by the plurality of pixels.

15. The method of claim 14, wherein creating a corrected image based on the raw shadow image comprises:
performing an algorithm corresponding to a configuration of the plurality of pinhole-like transparent regions and on the raw shadow image.

16. The method of claim 13, further comprising:
providing a signal indicative of the identified pixel coordinates to a guidance and control system.

17. The method of claim 13, further comprising:
correcting for the optical distortion of the convex surface.

18. The method of claim 13, wherein transmitting, to a rear planar surface a lens, light received at the front convex surface of the lens in an optically-neutral fashion comprises:
transmitting, via a fiber optic bundle extending from the front convex surface to the rear planar surface, the light received at the front convex surface of the lens.

19. The method of claim 13, further comprising:
configuring the plurality of pinhole-like transparent regions of the coded-aperture plate as a doubly-Toeplitz design.

20. The method of claim 13, wherein creating a plurality of overlapping images of a scene aligned along an optical axis further comprises:
locating a plurality of pinhole-like apertures within 200 microns of the focal plane array.

* * * * *